Aug. 10, 1943.　　F. C. JOHNSTON　　2,326,144
MEASURING VESSEL
Filed May 15, 1941　　3 Sheets-Sheet 1

Inventor
Francis Carroll Johnston
By
Attorney

Aug. 10, 1943.   F. C. JOHNSTON   2,326,144
MEASURING VESSEL
Filed May 15, 1941   3 Sheets-Sheet 3

Inventor
Francis Carroll Johnston

By  Clarence A. O'Brien

Attorney.

Patented Aug. 10, 1943

2,326,144

UNITED STATES PATENT OFFICE 2,326,144

MEASURING VESSEL

Francis Carroll Johnston, Visalia, Calif.

Application May 15, 1941, Serial No. 393,634

3 Claims. (Cl. 73—166)

This invention relates to a measuring vessel, the general object of the invention being to provide means for measuring stable liquids, volatile liquids or liquified gases, for the purpose of comparing the deliveries of mechanical volumetric measuring devices, as a means of testing the accuracy of such devices or as a means of establishing a volume of stable liquid, volatile liquid, or liquified gas.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which.

Figure 1:
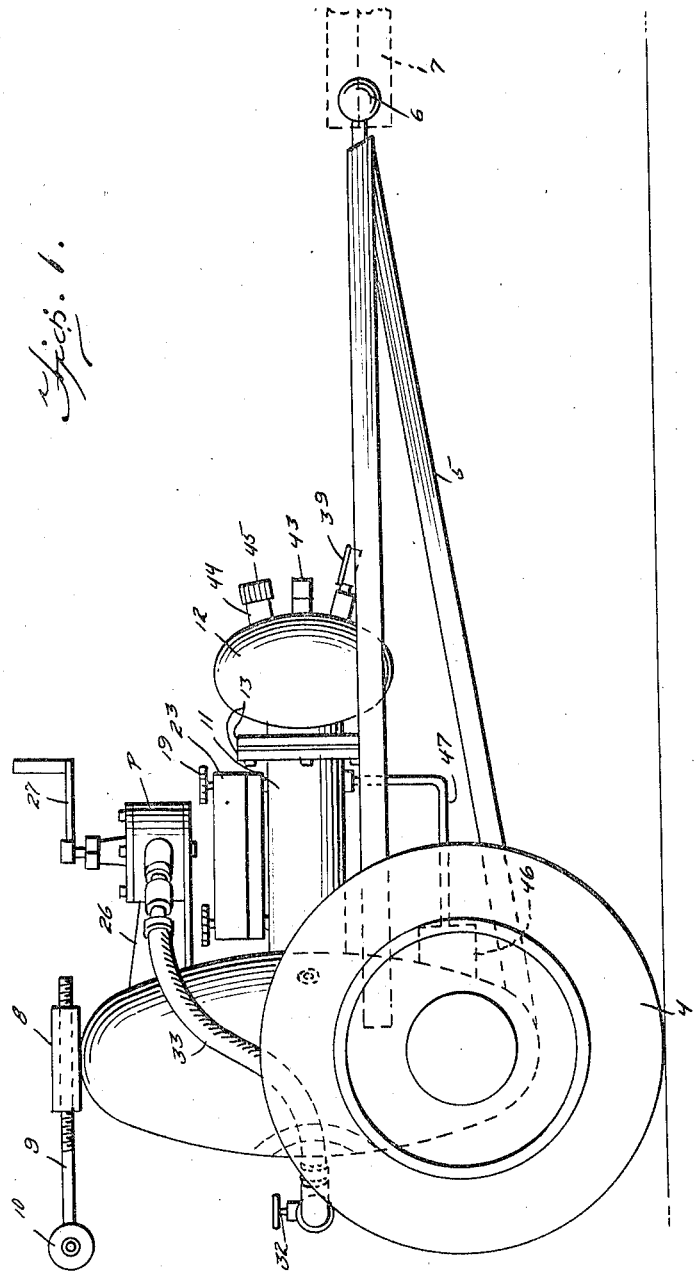
Figure 1 is an elevational view showing the invention in position to be transported from one place to another by a draft vehicle.
Figure 2:
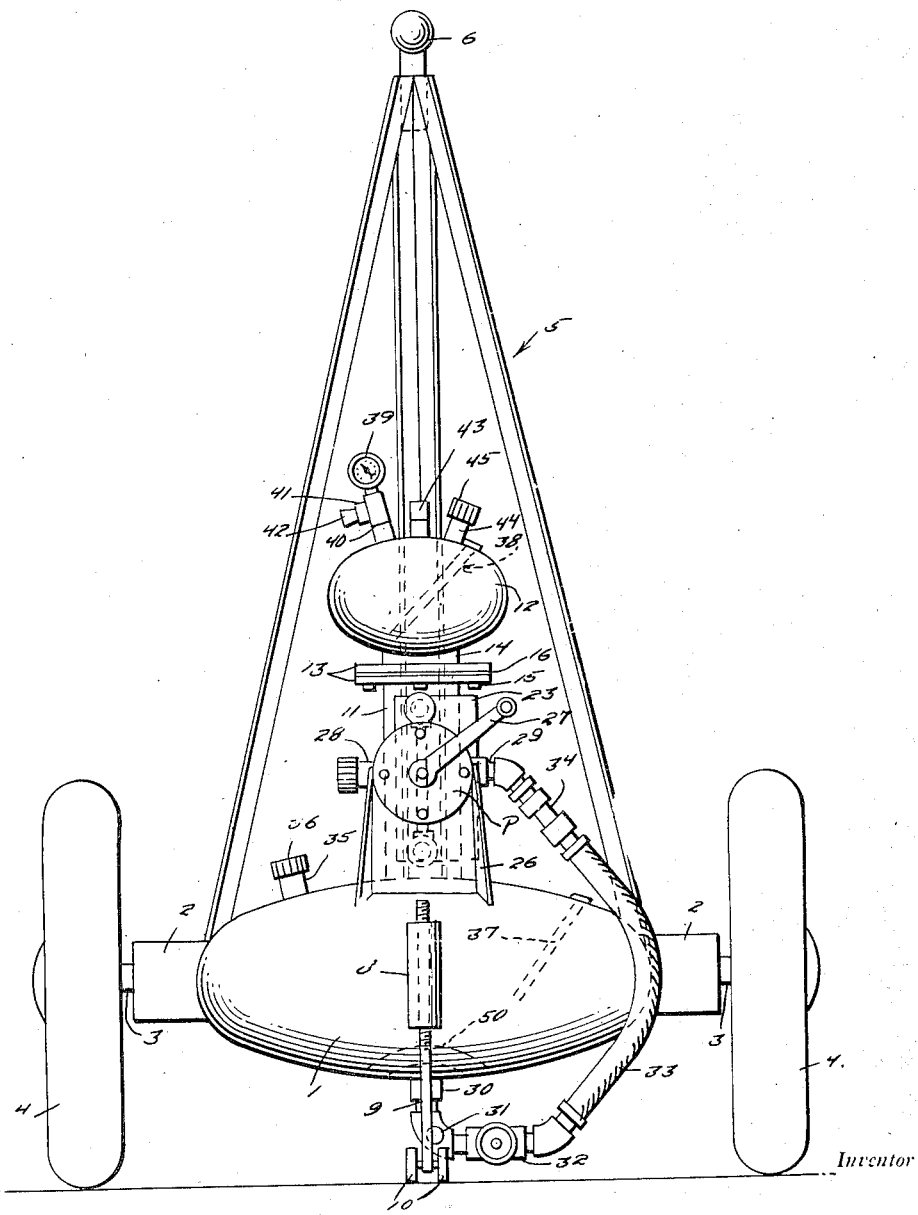
Figure 2 is a view taken at right angles to Figure 1 but showing the parts in upright position and in the position when the invention is to be used.
Figure 3:
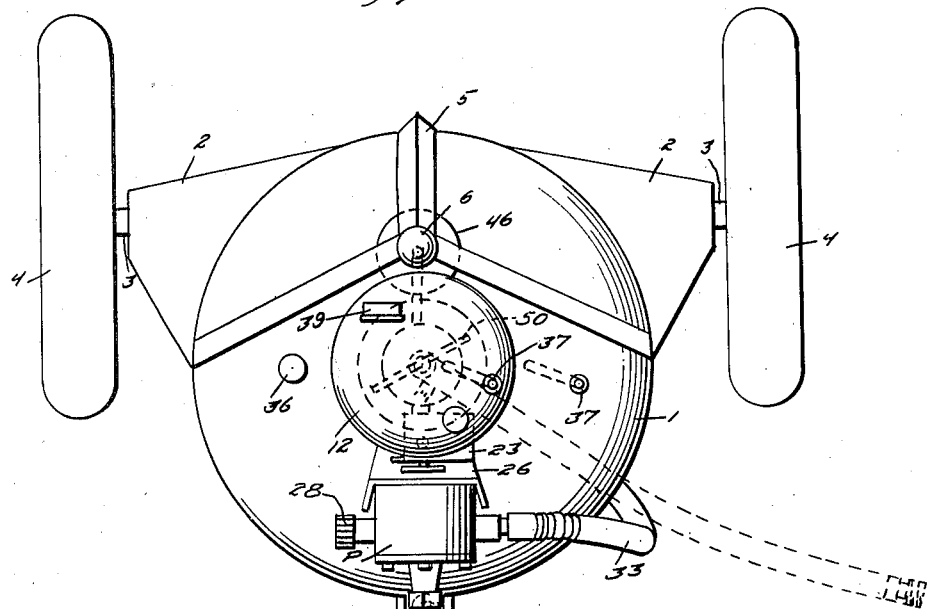
Figure 3 is a top plan view of Figure 2.
Figure 4:
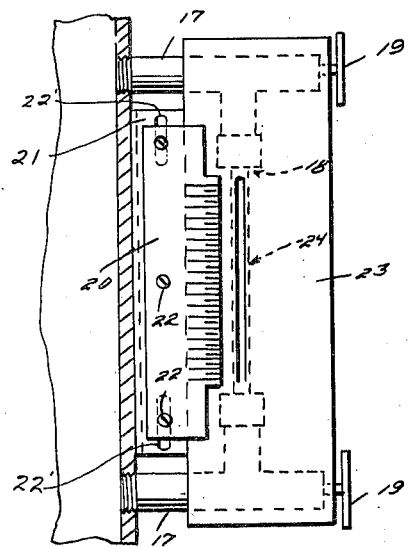
Figure 4 is a front view with parts in section showing the sight gauge and the refrigerant casing surrounding parts thereof.
Figure 5:
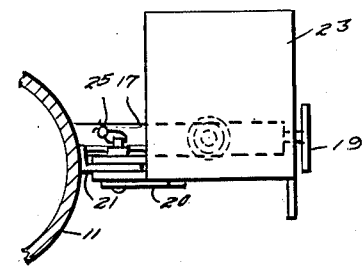
Figure 5 is a plan view of Figure 4.

In these drawings the numeral 1 indicates a tank or vessel of substantially circular shape (a vertical cross-section of which is oval in form) and having the frame parts 2 connected with one end, these parts carrying the spindles 3 for the wheels 4. A tongue 5 of substantially tripod shape is connected with the parts 1 and 2 and has a spherical member 6 at its free end which is adapted to be connected to a socket member of a draft vehicle or the like as shown in dotted lines at 7 in Figure 1. These parts are so arranged that when the tongue is in horizontal and operative position the tank or member 1 extends vertically as shown in Figure 1 but when the apparatus is to be used the tongue extends upwardly and the member 1 horizontally as shown in Figures 2 and 3. A sleeve 8 is connected to the member 1 and is internally threaded to receive the threaded part of a shaft 9 which carries the wheels 10, these wheels with the wheels 4 acting to support the apparatus in operative position as shown in Figure 2 and by having the member 9 threaded in the sleeve 8 this member 9 can be adjusted to level the apparatus. A tubular neck 11 extends upwardly from the top of the member 1 when the parts are in operative position and a vapor dome 12 is adapted to be removably attached to the upper end of the neck by the flanges 13, one on the neck and one on a depending part 14 of the dome, and the bolts 15. A gasket 16 is located between the flanges to provide a fluid-tight joint. This neck has the tubular members 17 of the sight gauge 18 connected therewith, the members being controlled by valve means operated by the handles 19 and a gauge plate 20 is adjustably connected to a support 21 on the neck by the screws 22 and slots 22', the latter provided in the support 21. A casing 23 partially encloses the tubular members 17 and the sight gauge 18 and is adapted to contain any suitable refrigerant for cooling said gauge 18 and members 17, said casing having a slot 24 therein so that the glass can be seen. A suitable inlet, not shown, may be provided in the casing 23 introducing refrigerant therein. After the gauge plate 20 is adjusted the parts are sealed in adjusted position by the sealing means shown generally at 25 in Figure 5. A pump P is supported by the upright 26 from the member 1 and said pump can be operated by hand or by a motor, the drawings showing it as being operated by hand through means of a crank 27. A nipple 28 leads from the outlet of the pump and a nipple 29 leads from the inlet of the pump. A nipple 30 extends from the bottom of the vessel 1 and a test valve 31 is connected therewith. A valve casing 32 is connected with the valve 31 and a hose 33 is adapted to be connected with the valve casing 32 with the other end connected by the coupling means 34 with the inlet nipple 29 of the pump. The member 1 is provided with a filling nipple 35 closed by a cap 36 and adapted to have a hose or pipe line connected therewith when the member 1 is to be filled. A well or tube 37 extends at an angle into the member 1 and a similar tube or well 38 extends into the dome, these wells being adapted to receive thermometers to permit the temperatures of the fluid in the members 1 and 12 to be ascertained simultaneously. The bottoms of the wells 37, 38 are closed, as indicated in Figure 3.

A pressure gauge 39 is connected by a tubular member 40 with the dome and said tubular member is provided with a lateral extension 41 which is closed by a blow out fitting or fusible plug 42. A pressure relief fitting 43 is also connected with the top of the dome and an outlet fitting 44 is connected with the top of the dome in a shape to receive a cap 45 or by removing the cap a hose can be connected with this fitting.

A small housing 46 is welded or otherwise fastened to the top of the member 1 and a tube 47 leads from the top of the housing to the neck 11 above the sight gauge, this housing acting as a capacity adjustment for the vessel 1 so as to make the vessel approximately of the desired capacity. However, this housing may be omitted and the neck 11 made longer so as to permit adequate range in positioning of the gauge glass. In either instance, whether the gauge glass be employed as adjustment or whether the capacity adjustment housing 46 be employed, final adjustment is to be accomplished by position of the zero of the graduated scale in proximity to the point of fixed capacity of the vessel as indicated by the level reached by said fixed capacity in the gauge glass.

The vessel will be of a known capacity and if the device is to be used for stable liquids then the dome 12 is removed and the liquid from the vessel, the capacity of which is to be tested is transferred into the vessel 1 and if this liquid comes to a level on the gauge assembly which is equal to the sealed capacity of the vessel 1, this proves that the tested vessel is correct or in proper adjustment. Of course, if the liquid level does not come to the proper graduation on the member 20 then this proves that the tested vessel, or device is not correct and the operator will know just how much the tested vessel or device is wrong. Of course, if desired an amount of liquid can be placed in the testing device which is equal to the amount which the tested vessel is supposed to contain and then this liquid can be transferred to the vessel to be tested by operating the pump and drawing the liquid from the member 1 through the pump and to the tested vessel by means of a hose connected with the outlet nipple 28. In this case the pump may be so positioned as to assure complete transfer of the liquid employed in the test. If the tested vessel is provided with a pump then this pump can be connected with the outlet nipple 30 by a hose which might be the hose 33.

If the vessel to be tested contains volatile liquid or liquified gas then the dome 12 is put in place and a hose is used to connect the nipple 44 with a dome or top part of the vessel to be tested so that the vapor pressure will equalize in the two apparatus. This hose may contain a valve so that it can be opened or closed. However, the hose is kept open while the liquid is being transferred from the tested vessel to the vessel 1 and thus the capacity of the vessel being tested can be compared as before set forth. The pressure in the apparatus can be ascertained by the pressure gauge 39. During the removal of the liquid from the vessel 1, the operator operates the test valve 31 for detection of dry gas so that he can determine when the last evacuation is completed and the test cycle has been completed and the vessel is ready for another comparison.

When the device is utilized in making a comparison under circumstances involving a rise in pressure in the vessel, as a means of simulating the filling of a closed vessel against pressure, the nipple 44 is closed by its cap 45 and then the liquid is introduced into the vessel 1 through the nipple 35 and of course the liquid entering the device will compress the vapor in the dome and this pressure will be noted from the gauge 39 and thus the amount of pressure can be ascertained against which the liquid, being used for filling the vessel, acts during a comparison.

It is manifest that any vessel undergoes distortion according to variations of pressure to which it is subjected, whether external or internal. So I calibrate my vessel at atmospheric pressure with water, and set the graduated scale so that its zero is in coincidence with the liquid level of water in the gauge glass. Then the vapor dome is put in place and I build up pressure in the vessel with compressed air and note the lowering of water in the gauge glass at various pressures. These observations then constitute the basis for a chart whereby the pressure correction chart for the vessel is established. As an instance the characteristics of a given vessel, of fifty gallon capacity to zero at atmospheric pressure, becomes plus 8 cubic inches at 25 lbs.; plus 25 cubic inches at 100 lbs.; and plus 30 cubic inches at 125 lbs. etc. So it is when employing the vessel in a comparison whereupon the pressure gauge discloses that the vessel is subjected to a pressure of 75 lbs. per square inch, and the gauge glass indicates 20 cubic inches in deficiency, the true contents of the vessel would be 50 gallons even. The same procedure in reverse will adapt the vessel to conditions of vacuum by utilization of a distortion chart made at various stages of vacuum, and employing as means of calibration a liquid of low volatility.

The influence of the refrigerant as used in the refrigerant holder 23 is, to all intent and practical purpose, confined to the gauge glass and gauge fittings, and does not affect the bulk of the liquid in the vessel to any appreciable extent. Such cooling of the gauge glass and gauge fittings has the effect of causing a disturbed highly volatile liquid to become quiescent (to stop boiling).

A vortex breaker means 50 is placed in the bottom of the vessel 1 as shown in dotted lines in Figure 2. This is in the form of a simple vane fixed across the drain aperture leading to the nipple 30 and in a plane coincident to the axis of the aperture.

The parts indicated by the numeral 35 and 44 may be self-closing valves of the type in common use and it will, of course, be understood that the device is calibrated as a "wet" measure. That is, the device is first filled with water or any other suitable liquid and then drained and then supplied with a known volume of water or liquid so that when it is again drained it will deliver the known volume.

By providing the tongue 5 in the manner shown in the drawings, it will be out of the way when the device is in operation and it permits a low positioning of the vessel and when traveling along with the tongue in horizontal position the vessel is tipped over, thus creating adequate road clearance and lessens danger of damage to drain piping and other parts.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a device of the class described, a vessel, a tubular neck rising from the top of the vessel, means for introducing fluid into the vessel, means of draining the fluid from the vessel, a sight gauge carried by and in communication with the neck, and a vapor dome detachably connected with the upper end of the neck and provided with a nipple adapted to be closed by a cap or to have a hose connected therewith and a pressure gauge in communication with the dome, and thermometer receive wells in the vessel and in the dome.

2. In an apparatus of the class described, a vessel, a tubular neck rising from the vessel, a sight gauge associated with the neck, a vapor dome, means for detachably connecting the dome to the upper end of the neck, a pressure gauge connected with the dome, an outlet nipple connected with the dome and adapted to receive an outlet pipe, a cap for closing the nipple, a pump supported from the vessel and provided with inlet and outlet nipples and means for connecting the inlet nipple with the bottom of the vessel when desired and means for introducing liquid into the vessel.

3. In apparatus of the class described, a circular vessel of oval form in vertical cross-section, a wheel mounting supporting said vessel at one side edge portion thereof for adjustment about an horizontal axis into horizontal and upright positions, respectively, an adjusting tongue connected to said vessel and extending vertically and horizontally in the upright and horizontal positions of said vessel and for holding the vessel in such positions, a tubular axial neck extending from one side of the vessel to be swung into horizontal and upright positions in the corresponding positions of said vessel, a vapor dome attached to said neck, and a discharge line attached to the opposite side of said vessel diametrically opposite said dome for draining the same at its lowermost point when in horizontal position.

FRANCIS CARROLL JOHNSTON.